INVENTOR
FRANK K. LOCKE

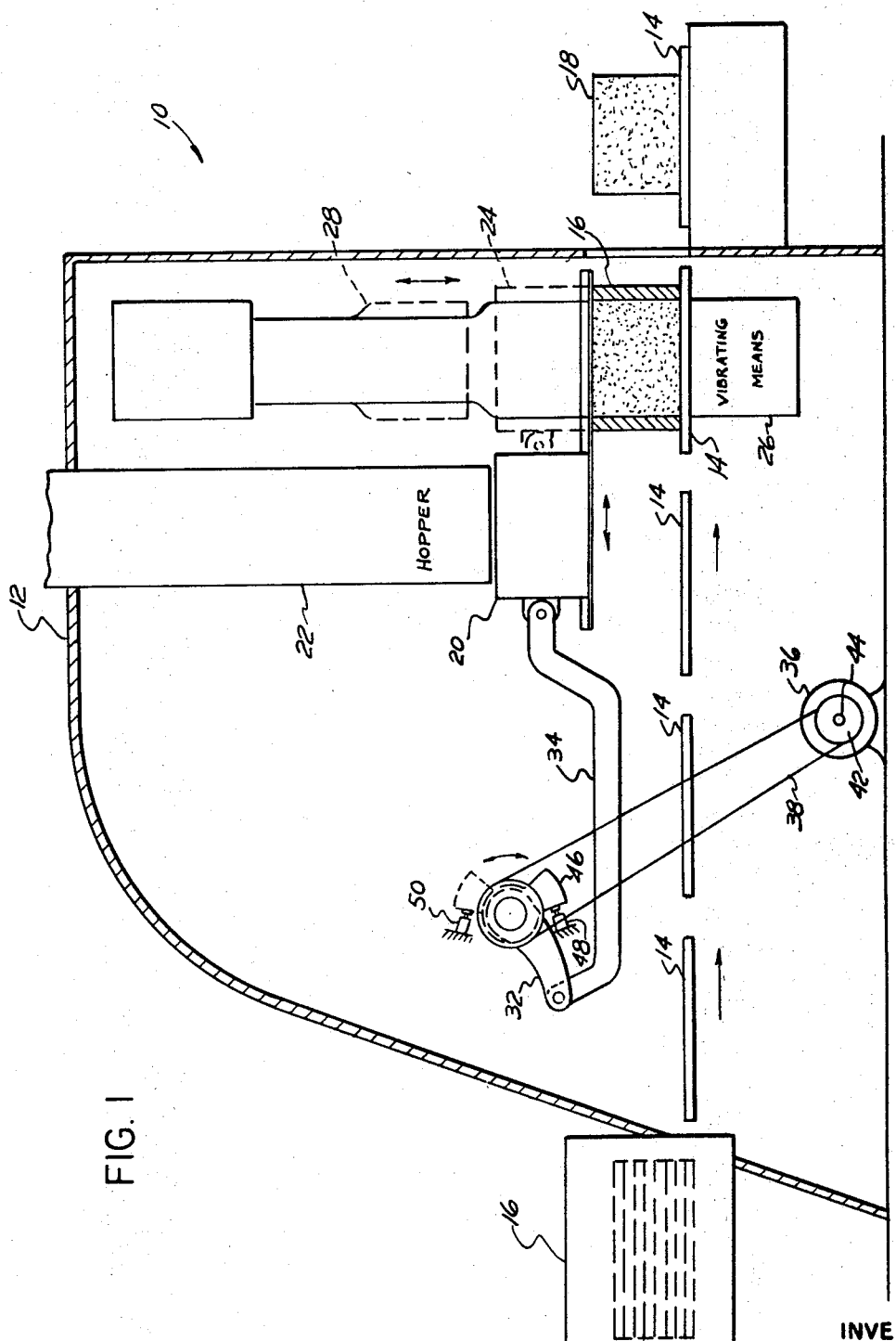

BY Hauke, Krass, Gifford, & Patalidis

ATTORNEYS

United States Patent Office 3,537,157
Patented Nov. 3, 1970

3,537,157
BLOCK FORMING MACHINE WITH SELF-COOLING SHOCK ABSORBER MEANS
Frank K. Locke, Hudson, Mich., assignor to Stearns Manufacturing Co., Flat Rock, Mich., a corporation of Michigan
Filed Mar. 21, 1968, Ser. No. 714,939
Int. Cl. B28b *13/02;* F16d *57/00*
U.S. Cl. 25—103                                8 Claims

ABSTRACT OF THE DISCLOSURE

A block-forming apparatus having major components driven by individual motor drive means between spaced positions. Each motor driven means has solenoid actuated brake means which are deenergized independently of the deenergization of the motor's electrical field when the motion of the associated component is to be terminated. The deceleration of the component, such as the feed drawer, as it approaches its operative positions is cushioned by a self-cooling hydraulic shock absorber system.

BACKGROUND OF THE INVENTION

This invention relates to apparatus for forming building blocks and more specifically to apparatus of this type having a self-cooling shock absorber means and a controlled drive means for controlling the motion of a driven component which is reciprocated between a pair of spaced positions.

Automatic block-forming machines employ a number of reciprocating components such as the packing head which is alternately raised and lowered between a pair of positions relative to a mold box in order to compact the block-forming material in the mold box and the feed drawer which is reciprocated between a first position where it receives a charge of block-forming material from a hopper and a second position where it discharges the block-forming material into the mold box. The nature of the block-forming process is such that these components must be of rugged construction. Therefore they have a substantial mass which must be accelerated as the component is moved from one position and then decelerated as the member approaches its alternate position. The combination of a substantial mass and a high velocity produces a high momentum which must be asorbed in as short a time span as possible as the component is decelerated and then stopped.

Typically hydraulic shock absorber means are coupled with the driven component such as the feed drawer as it approaches one of its alternate positions so as to provide a cushioned deceleration. One of the problems with conventional hydraulic shock absorber means is that in a high speed machine, the massive forces acting on the piston of the shock absorber causes the oil to heat up thereby changing its operating characteristics. To accommodate this change in the oil's characteristics, the shock absorber is usually either adjusted or the oil periodically changed. One of the broad purposes of the present invention is to provide an improved shock absorber means that does not require frequent adjustment or oil changes to compensate for changes in the operating properties of the oil.

Another problem associated with controlling the motion of various driven components such as the feed drawer, is that one of the increments of the block-forming cycle is the time required in terminating the travel of the components as they approach their alternate position. For instance, the feed drawer is conventionally coupled to a reversible electric motor in such a manner that the output shaft of the motor is alternately rotated in opposite directions to move the feed drawer in opposite directions. As the feed drawer approaches one of its operative positions, it is necessary to terminate the rotation of the motor's output shaft. To accomplish this, conventional motors are equipped with a solenoid-actuated brake. The field of the motor and the solenoid are energized through a common electric circuit in such a manner that they are both deenergized by closing a single switch. The electrical fields of both the motor and the solenoid are intended to collapse together so that the motor force driving the shaft is terminated simultaneously with the actuation of the brake shoe. It has been found, however, that there is a delay between the instant the circuit is deenergized and the solenoid's field collapses because of the residual electrical field of the motor. It is, therefore, another purpose of the present invention to provide a solenoid-actuated brake circuit for a drive motor having a quicker response when its electrical circuit is deenergized.

SUMMARY

The preferred embodiment of the present invention is described with reference to decelerating and stopping the motion of the feed drawer of a block-forming apparatus which is supported for reciprocal motion between a pair of spaced operative positions; however it is to be understood that the invention is applicable for controlling the motion of other components such as the packing head and the like. In the preferred embodiment, the feed drawer is reciprocated between a rearward position beneath a supply hopper for receiving a charge of block-forming material and a forward position over the mold box. The feed drawer is advanced from its rearward position to its forward positions and then returned to its rearward position during each block-forming cycle.

A drive shaft, rotatably supported on the frame of the block-forming apparatus and connected to a reversible motor drives the feed drawer. Rotation of the motor's output shaft in one direction causes the drive shaft to rotate and move the feed drawer in one direction. Rotation of the motor's output shaft in the opposite direction moves the feed drawer to move in the opposite direction. A stop member on the drive shaft is arranged to engage one of a pair of shock absorber means as the feed drawer approaches either its first or its second position.

The preferred shock absorber means comprises a piston reciprocally mounted in a fluid cylinder with a rod engageable with the stop member. Motion of the piston in the cylinder causes a working fluid chamber to expand or contract depending on the direction of the piston's motion. The fluid chamber is connected by conduit means to a fluid reservoir having a supply port and return port. A pair of check valves are disposed in the conduit means between the reservoir and the working chamber and adapted so that when the piston moves under a load the fluid is exhausted at a controlled rate from the working chamber to the return port of the reservoir. When the piston changes directions to enlarge the working chamber, the connection to the return port of the reservoir is closed and the connection to the supply port opened, so that fresh oil is introduced into the chamber. Since the oil acts as a damping medium, it tends to heat up as it is exhausted from the working chamber. By discharging it to the reservoir and admitting a fresh supply of relatively cool oil into the chamber during each cycle, the oil in the cylinder is constantly exchanged so that it has a uniform viscosity and provides consistent cushioning characteristics.

The drive motor of the preferred block-forming apparatus employs a solenoid-actuated brake. Electrical circuit means connect the motor and the brake so that they are simultaneously energized, however the circuit has a pair of contacts for deenergizing the fields of the motor and the solenoid in order to stop the motion of the feed drawer. One of the contacts is opened in order to collapse the field of the motor and the second contact is opened to independently collapse the field of the solenoid so as to permit the brake to more quickly engage the output shaft of the motor. This circuit arrangement eliminates the time delay in stopping conventional motor drive means caused by the residual field in the motor which affects the field of the solenoid. The advantage of this novel circuit is that it eliminates coasting of the feed drawer immediately prior to its coming to a full stop. Thus, the feed drawer can be driven substantially the full length of its travel, at maximum velocity. The resulting time reduction in the machine's cycle is reflected in a higher output rate for the block-forming apparatus.

Still other advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views in which:

FIG. 1 is a side elevational view of a block-forming machine incorporating the preferred embodiment of the invention with various components of the machine shown diagrammatically and in dotted lines.

DESCRIPTION OF THE PREFERRED EMBODIMENT

Figure 3:
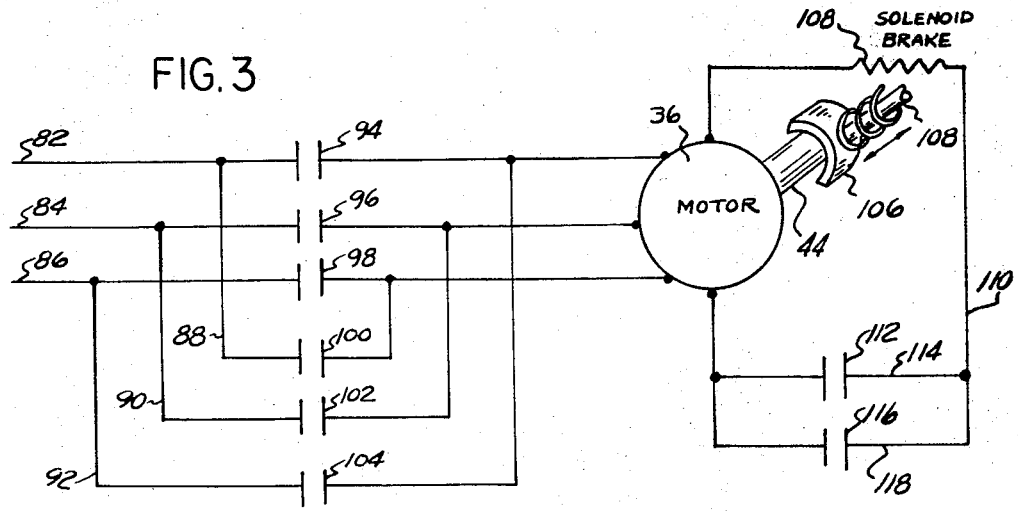
FIG. 3 is a preferred electrical circuit for energizing the feed drawer drive means.

Now referring to the drawings, the preferred block-forming apparatus is illustrated in FIG. 1 at 10 and comprises a frame means 12. A series of pallets 14 are stored in a suitable magazine 16 and individually advanced forwardly by a pallet pusher (not shown). The pallets 14 are advanced under a mold box 16 having internal dimensions accommodating the shape of a finished block 18. A feed drawer 20 is advanced during each machine cycle from a rearward position wherein it receives a charge of suitable block-forming material from a hopper means 22 to a forward position illustrated in phantom at 24 where its contents are discharged into the interior of the mold 16. A vibrating means 26 is then operated to assist in packing the contents of the mold and the feed drawer is retracted to its rearward position. A packing head 28, which is normally in a raised position so as not to interfere with the motion of the feed drawer, is then lowered so as to compact the contents of the mold box into a block of the correct size. The mold box 16 which is open at both its upper and lower faces is then raised upwardly and stripped from the block and pallet. The block 18 and the pallet 14 are then advanced forward and out of the machine. This operation as thus far described is essentially conventional.

The feed drawer 20 has a substantial weight because of its sturdy construction and various material agitating means (not shown) which are carried on the drawer. During each cycle the drawer is advanced from its rearward position to its forward position and then returned to its rearward position so that it is mounted on frame means 12 for reciprocatory motion. A drive shaft 30 rotatably mounted on the frame 12 is coupled to the feed drawer 20 by a pair of link means 32 and 34. The shaft 30 is connected to a reversible drive means 36 through a chain 38, a sprocket 40 mounted on the shaft 30 and sprocket 42 mounted on the output shaft 44 of the drive means 36. The drive means 36 is adapted to rotate its output shaft 44 in opposite directions so as to rotate the drive shaft 30 in opposite directions and thereby move the feed drawer 20 between its rearward and forward positions.

A stop member 46 is fixedly attached to the shaft 30 and rotates with the shaft between upper and lower positions. As the shaft 30 rotates in a clockwise direction as viewed in FIG. 1, to return the feed drawer 20 to its rearward position, the stop member 40 engages a lower shock absorber means 48 which is mounted on frame 12 and cushions the return of the feed drawer. As the shaft 30 rotates in a counterclockwise direction so as to advance the feed drawer to its advanced position over the mold box 16, the travel of the feed drawer 20 is cushioned as it approaches its advanced position by the stop member 40 engaging an upper shock absorber means 50 which is similar in construction to the lower shock absorber means 48. The shock absorber means 48 and 50 are both fixedly mounted to the frame means 12 and it is to be understood that the detailed description of the lower shock absorber means 48 will also apply to the construction of the upper shock absorber means 50. It is to be further understood that other shock absorber means (not shown) similar to the shock absorber means 48 are mounted on a frame means for cushioning the deceleration of the packer head 28 as it moves between its raised and lowered positions.

Figure 2:
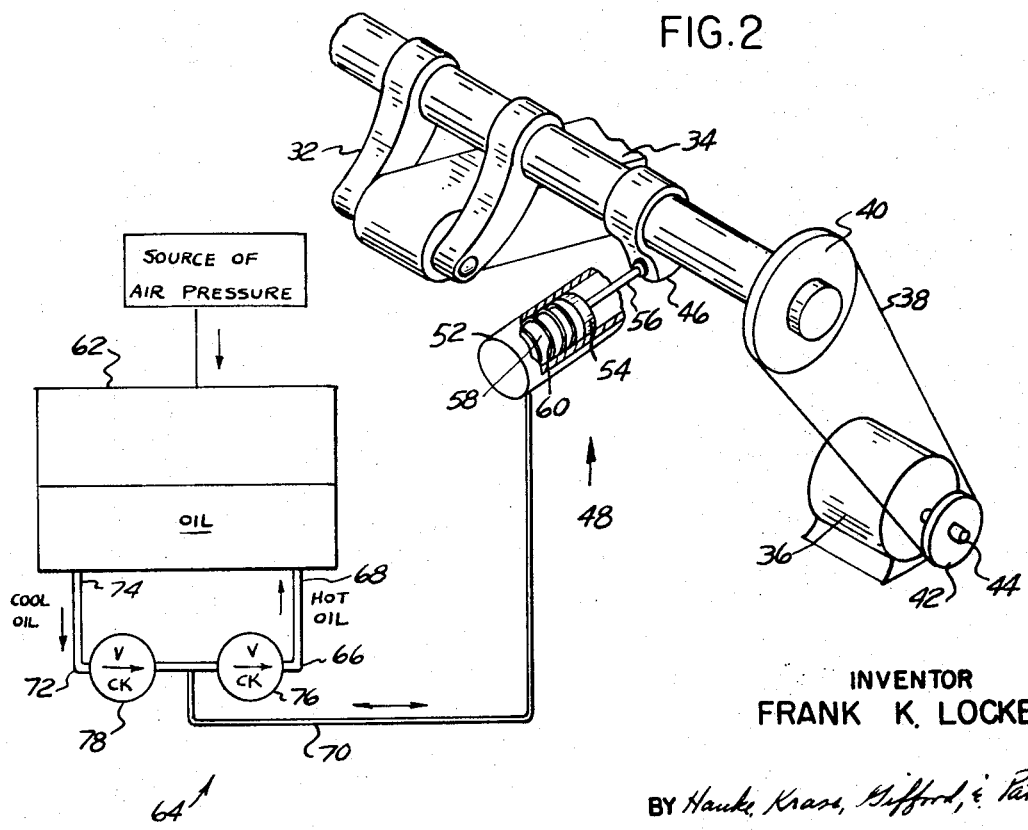
FIG. 2 is a fragmentary perspective view of the feed drawer drive shaft with parts of the preferred shock absorber means schematically illustrated.

Referring to FIG. 2, the shock absorber means 48 includes a hydraulic cylinder 52 mounted on the frame and a piston 54 disposed in the cylinder with a piston rod 56 adapted to engage the stop member 46 as it rotates as the feed drawer 20 is being returned to its rearward position. The piston 54 forms a movable wall of a fluid chamber 58 in the cylinder. A spring 60 in the chamber 58 biases the piston 54 so that the rod 56 is normally extended when it is not engaged with the stop member 46.

A hydraulic reservoir 62 is also mounted on the frame 12 and connected to the fluid chamber 58 by conduit means 64. The conduit means 64 includes a hot oil conduit 66, has one end connected to a return port 68 of the reservoir and its opposite end connected with a main conduit 70. A cool oil conduit 72 has one end connected to a supply port 74 of the reservoir and its opposite end connected to the main conduit 70. A check valve 76 is disposed in the hot oil conduit 66 and arranged so that it opens in response to a pressure increase in the conduit 70 caused by the piston 54 exhausting oil from the chamber 58. A second check valve 78 is connected in the cool oil conduit 72 and arranged so that it permits oil to flow from the reservoir through the supply port 74 when there is a pressure reduction in the conduit 70 caused by motion of the piston 54 toward its extended position. Thus the check valves 76 and 78 are alternately opened and closed with one of the valves being opened and the other closed when the piston 54 is moving in one direction and the two valves reversing their condition when the piston is moved in the opposite direction.

In operation, when the feed drawer 20 is in its forward position, the rod 56 is extended. As the feed drawer 20 is returned to its rearward position, the stop member 46 engages the rod 56 and causes the piston 54 to move so as to force the oil in the chamber 58 toward the reservoir 62. The rate at which the oil is transferred to the reservoir is controlled by the check valve 76 which throttles the oil so that the feed drawer experiences a cushioned deceleration. During the deceleration the check valve 78 is closed. As the oil is transferred from the chamber 58 to the reservoir, its temperature tends to increase because of the throttling effect. When the feed drawer 20 is advanced toward its forward position so that the stop element 46 is disengaged from the piston rod 56, the piston 54 moves in the opposite direction to enlarge the chamber 58, this reduces the pressure in the conduit 70 so that the valve 76 closes.

The reservoir 62 is connected to a source of air pressure 80 which acts on the surface of the oil to create a pressure differential that opens the check valve 78 to allow relatively cool oil to be transferred from the reservoir 62 to the chamber 58 as the piston is moved toward its extended position. Thus during each cycle of the block-forming apparatus, the feed drawer 20 is advanced and returned between its two operative positions and each time it approaches one of these positions, it experiences a cushioned deceleration. During each cycle oil is substantially exchanged in the chamber 58. This continuous oil exchange in the chamber 58 insures that the oil remains at a fairly constant temperature and viscosity thereby insuring that the feed drawer experiences a fairly consistent deceleration during each cycle. This eliminates the necessity for the operator of the machine to continually adjust the shock absorber to compensate for changes in viscosity caused by changes in the oil temperature. In addition to a more consistent operation, the shock absorber components also experience a longer and more useful life because of the consistent qualities of the oil.

Now referring to FIG. 3, the motor 36 is supplied from a 3-phase source of electrical energy through lines 82, 84 and 86 when the motor is being rotated in one direction and through lines 88, 90 and 92, when the motor is being driven in the opposite direction. Contact means 94, 96 and 98 in the lines 82, 84 and 86 are adapted to be opened and contact means 100, 102 and 104 adapted to be closed when the motor is rotating in one direction. The contact means are actuated to their alternate condition in order to rotate the motor in the opposite direction.

A brake element 106 is arranged to engage the output shaft 44 as the feed drawer approaches either its forward or rearward positions. A spring biased means 108 urges the brake element toward engagement with the output shaft 44. However, a solenoid means 108 disposed in a line 110, when energized, disengages the brake 106 from the shaft 44. When the feed drawer 20 is being advanced toward its forward direction the contacts 94, 96 and 98 are closed and a contact 112 in the line 114 is closed so as to energize the solenoid 108. Similarly when the contacts 100, 102 and 104 are closed to rotate shaft 44 in the opposite direction, a contact 116 in line 118 is closed so as to energize the solenoid 108. Thus in operation whenever the field of the motor 36 is energized so that it provides a driving force for output shaft 44, the solenoid 108 also is energized so that the brake 106 is released from the output shaft 44. However, when the particular set of contacts supplying energy to the motor 36 are opened so as to collapse the field of the motor, the associated contact supplying the electrical energy to the solenoid 108 is also simultaneously opened, thereby permitting the field of the solenoid to collapse independently of the field of the motor. This arrangement eliminates the time delay inherent in conventional motors where the solenoid is electrically connected in series with the motor so that the rate at which its field collapses depends on the condition of the field of the motor. By eliminating this time delay, the output shaft 44 can be driven substantially the entire travel of the feed drawer since it is not necessary to provide for a coasting period between the instant the motor is deenergized and the instant the feed drawer comes to a complete stop.

Thus it can be seen that I have described in detail improved apparatus for controlling the motion of a driven component of a block-forming apparatus such as the feed drawer by means of a self-cooling shock absorber, and a more responsive braking device for the drive motor.

Although I have described but one embodiment of my invention, it is to be understood that various changes and revisions can be made therein without departing from the spirit of the invention as expressed in the scope of the appended claims.

I claim:

1. In a machine for molding building blocks, including a frame and a member supported for movement relative to the frame, drive means for moving the member toward a predetermined operative position as the machine progresses through a block-forming cycle, shock absorber means for cushioning the deceleration of said member as it approaches the predetermined position, comprising:

(a) a fluid cylinder mounted on said frame;
(b) piston means disposed in said cylinder for reciprocal motion in forward and reverse directions, said piston means forming a wall of a variable volume fluid chamber in said cylinder so that motion of said piston means in the forward direction reduces the volume of said chamber and motion in the reverse direction increases the volume of said chamber;
(c) motion transmitting means adapted to connect said member and said piston means so that motion of said member toward said predetermined position moves the piston means in the forward direction;
(d) a fluid reservoir having supply and return ports;
(e) conduit means connecting the supply and return ports of said reservoir with the fluid chamber of said cylinder;
(f) first valve means in said conduit means adapted to close fluid communication from said chamber to the return port of said reservoir when the piston means is moving in the reverse direction, and adapted to open fluid communication between said chamber and the return port of said reservoir to control the fluid flow from said chamber to the return port of said reservoir when the piston is being moved in the forward direction so as to cushion the motion of said member as it approaches said predetermined position; and
(g) second valve means in said conduit means adapted to close fluid communication from said chamber to the supply port of said reservoir when the piston is moving in the forward direction, and open fluid communication between the supply port of said reservoir and said fluid chamber when the piston means is moving in the reverse direction so as to admit a fresh supply of fluid into said chamber.

2. The invention as defined in claim 1, wherein said fluid comprises oil and including air pressure means connected with said reservoir for maintaining said oil under pressure.

3. The invention as defined in claim 1, wherein said member is supported for reciprocating motion and said drive means includes a drive shaft supported on said frame for rotation, reversible motor means connected with said drive shaft, linkage means connecting said drive shaft and said member so that rotation of said drive shaft in one direction moves said member toward said predetermined position and rotation of said drive shaft in the opposite direction moves said member away from said predetermined position, and including a stop member on said drive shaft engageable with said piston means as said member approaches said predetermined position.

4. The invention as defined in claim 3, wherein said reversible motor means comprises electric motor means having an output shaft coupled with said drive shaft and adapted for rotation in opposite directions, and including solenoid actuated brake means for engaging said output shaft as said member approaches said predetermined position.

5. The invention as defined in claim 3, wherein said motor means includes a reversible electric motor having an output shaft connected with said drive shaft, solenoid actuated brake means engageable with said output shaft when deenergized, circuit means for simultaneously electrically energizing said motor and said solenoid actuated brake means so that the brake releases the shaft as the motor rotates the shaft, first switch means in said circuit means for deenergizing the motor as said member approaches said predetermined position and second switch means for independently deenergizing the solenoid actuated brake so that the electrical field of said solenoid collapses independently of the field of said motor.

6. The invention as defined in claim 1, wherein said member is supported for motion between a pair of spaced positions and said drive means includes a drive shaft rotatably supported on said frame; reversible motor means coupled with said drive shaft so as to rotate said drive shaft in opposite directions; linkage means coupling said drive shaft with said member so that rotation of said drive shaft in opposite directions produces motion of said member in opposite directions between said positions and second shock absorbing means on said frame for cushioning said member as it approaches the second of said pair of positions.

7. The invention as defined in claim 6, wherein said member comprises feed drawer means supported for motion between a first position for receiving a charge of block-forming material from hopper means, and a second predetermined position for discharging said block-forming material into a mold means.

8. The invention as defined in claim 5, wherein said solenoid actuated brake means comprises a brake element movable toward and away from the output shaft of said motor, bias means urging said brake element into engagement with said output shaft and solenoid means operative upon being energized to move said brake element away from said output shaft and against the urging of said bias means.

References Cited

UNITED STATES PATENTS

| | | | |
|---|---|---|---|
| 2,588,669 | 3/1952 | Taccone | 164—194 X |
| 2,682,093 | 6/1954 | Clanton | 25—103 |

FOREIGN PATENTS 893,762  10/1953  Germany.

ROBERT D. BALDWIN, Primary Examiner

U.S. Cl. X.R.

164—194; 188—100